May 26, 1964     A. A. SIMPSON     3,134,886
WARMING AND DEHUMIDIFYING CABINET
Filed Feb. 2, 1962     2 Sheets-Sheet 1

INVENTOR.
ARTHUR A. SIMPSON
BY Kimmel & Crowell
ATTORNEYS.

May 26, 1964   A. A. SIMPSON   3,134,886
WARMING AND DEHUMIDIFYING CABINET
Filed Feb. 2, 1962   2 Sheets-Sheet 2

INVENTOR.
ARTHUR A. SIMPSON
BY Kimmel & Crowell
ATTORNEYS.

3,134,886
WARMING AND DEHUMIDIFYING CABINET
Arthur A. Simpson, 9714 Mark Lane, New Orleans 23, La.
Filed Feb. 2, 1962, Ser. No. 170,559
4 Claims. (Cl. 219—400)

This invention relates to a warming and dehumidifying cabinet, and has particular applicability to such a cabinet for retaining certain foodstuffs in crisp, dry condition.

A primary object of this invention is the provision of a cabinet structure including a double walled bottom having therein a heating element so constructed and arranged as to diffuse relatively low heat to the inner wall of the double bottom, and thus warm and dehumidify the contents of the cabinet.

A further object of the invention is the provision of such a cabinet which may be used for the storage of certain foods which, when dampened by the humidity in the air, normally become limp and soggy, such for example, as cookies and crackers, cereals, potato chips, nuts, popcorn, and similar foodstuffs, and which will retain or restore the normal crispness of such foodstuffs contained therein, by the drying or dehumidification of the air in the cabinet, and the warming thereof. A further object of the invention is the provision of such a cabinet which will retain such articles of food as salt, powdered milk, granular gelatin, or the like, in dry, warm condition, thus precluding the caking of such materials.

An additional object of the invention is the provision of a device of this character which may be supplied with current from any conventional electrical outlet, or which by a slight modification, may be battery powered so that the device may be employed while traveling in an automobile or a boat, or while camping, or under similar conditions where no ready source of electricity is available.

A further object of the invention is the provision of a device of this character which is highly ornamental in appearance, sturdy and durable in construction, and reliable and efficient in operation.

Still another object of the invention is the provision of such a device which may be manufactured and assembled with a comparative minimum of time, difficulty, and expense, and which is comprised of a relatively small number of components rendering maintenance costs negligible.

An additional specific object of the invention is the provision of a device of this character wherein a low heat resistance element is secured to the underside of the inner wall of the double bottom, and which is insulated therefrom in such manner as to diffuse heat evenly into the space between the double walls and thus to the bottom plate interiorly of the container to heat and dry the air contained therein.

A further specific object of the invention is the provision of a sheet of insulating material on the inner side of the bottom wall of the double bottom thus preventing direct heat from the heating element heating the outer or under wall of the device to such an extent as to damage any surface upon which it may be positioned.

Still another object of the invention is the provision of a device of this character having a pivoted access door which is secured in closed position by a magnetic latch means, in order to insure against incomplete or improper closure.

Still other objects reside in the combinations of elements, arrangements of parts, and features of construction, all as will be more fully pointed out hereinafter, and disclosed in the accompanying drawings wherein there is shown a preferred embodiment of this inventive concept.

In the drawings.

Similar reference characters refer to similar parts throughout the several views of the drawings.

Figure 1:
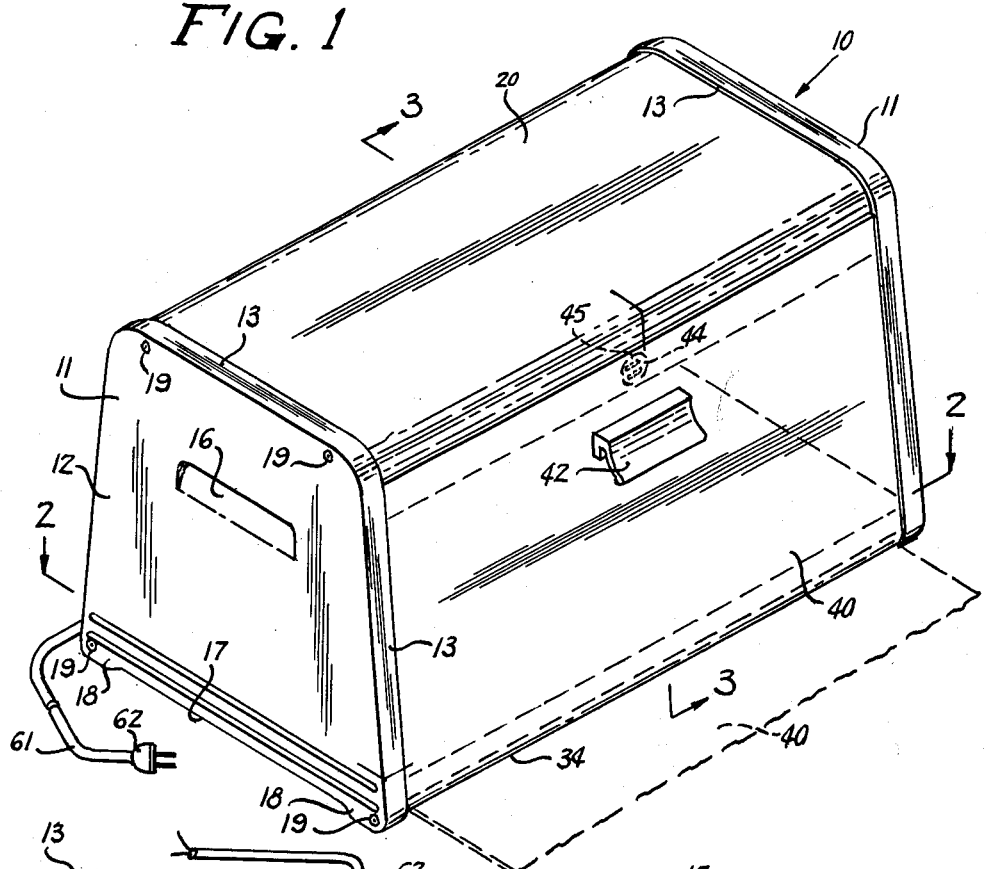
FIGURE 1 is an isomeric view of one form of cabinet constructed in accordance with the instant invention, certain concealed portions thereof being indicated in dotted lines.

Having reference now to the drawings in detail, the cabinet of the instant invention is generally indicated at 10 and is comprised of a pair of opposite end plates 11 which are substantially identical in configuration. Each end wall 11 is comprised of a suitable plastic such, for example, as high impact modified styrene, and each comprises an end wall 12 of substantially trapezoidal shape having a peripheral outer flange 13, spaced from an inner peripheral flange 14 to form an internal groove or channel 15, the purpose of which will be more fully described hereinafter.

A handle forming recess 16 is provided in the outer surface of each end wall 12, and a lower extremity 17 of each wall is provided with a depending foot or leg portion 18, each depending portion 18 being suitably apertured for the reception of a suitable screw 19, which may be of the Allen head variety, and which will be more fully described hereinafter. Similar openings adjacent the top of wall 12 are provided at the front and rear of the device for the reception of additional screws 19, and the purpose of which will also be hereinafter described.

The body of the cabinet is comprised of a sheet of copper plated, nickel plated steel, which is heavily chromed externally for ornamental effect, and which forms the top 20 and rear wall 21 of the device, the ends of the sheet fitting between the flanges 13 and 14 in the groove 15, so that when the ends 11 are secured together in a manner to be more fully described hereinafter, the whole assembly is retained against disengagement. Top wall 20 includes a relatively short depending front portion 22 which is inturned as at 23 and provided with an upstanding inner flange 24, while the lower end of rear wall portion 21 is inturned as at 25 to serve as a partial support for the bottom, also to be more fully described hereinafter.

The bottom of the cabinet is comprised of an outer or lower wall 27, which is provided along its front and rear edges with upstanding flanges 28 and 29, respectively, and an inner wall 30, the front and rear edges of which are provided with downwardly extending flange portions 31 which are inturned at their lower extremities as at 32, the bottom walls 27 and 30 with their associated flanges and the lower portion of end walls 11 forming a heating chamber 33. It is to be noted that the ends of inner bottom wall 30 terminate, as at 34', short of the end walls 11 to provide air space for the circulation of heated air. The components, including thhe top wall 20, rear wall 21, inner and outer bottom walls 30 and 27, and end members 11 are held in related assembly by means of tubular rods 34 which extend between the depending portions 18 and are internally threaded at their ends to engage the screws 19. Similar tubular rods 35 extend across the underside of top wall 20 and are seated in bushing members 36 integrally formed with end members 11, these rods being secured in related assembly by the upper screws 19, as previously mentioned.

Figure 2:
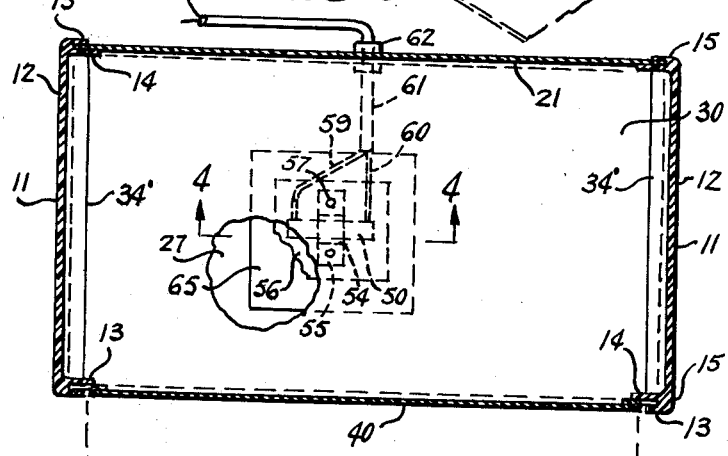
FIGURE 2 is a sectional view taken substantially along the line 2—2 of FIGURE 1 as viewed in the direction indicated by the arrows.
Figure 3:
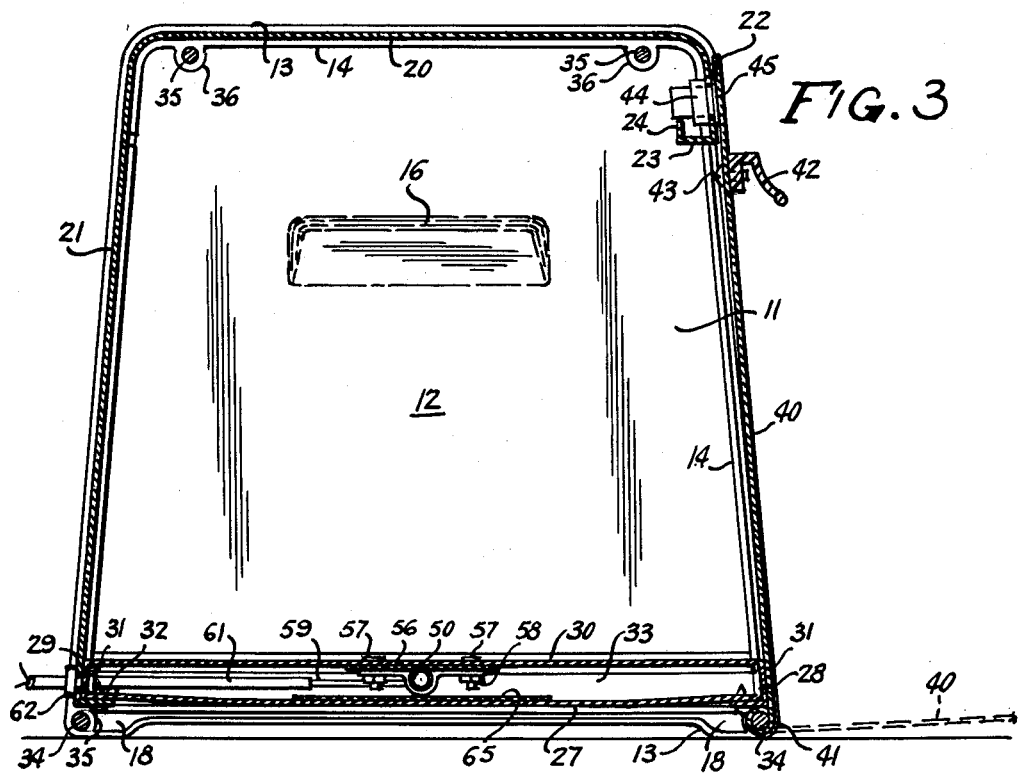
FIGURE 3 is an enlarged sectional view taken substantially along the line 3—3 of FIGURE 1 as viewed in the direction indicated by the arrows.
Figure 4:
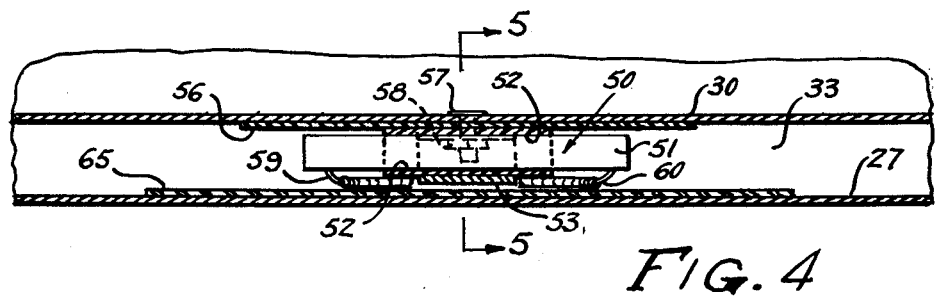
FIGURE 4 is an enlarged sectional view taken substantially along the line 4—4 of FIGURE 2 as viewed in the direction indicated by the arrows.
Figure 5:
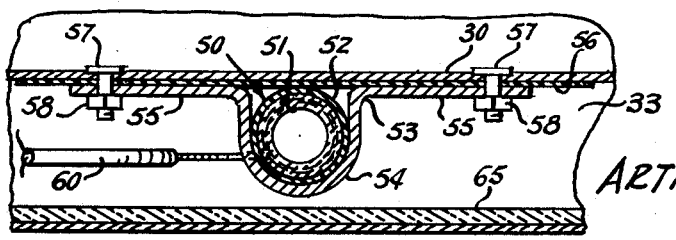
FIGURE 5 is a fragmentary enlarged sectional view taken substantially along the line 5—5 of FIGURE 4 as viewed in the direction indicated by the arrows.

A door or closure 40 is provided for the open front of the cabinet, and includes a lower reverted tubular portion 41 which surrounds the lower front tubular rod 34 and serves as a hinge. The door is preferably comprised of the same copper plated, nickel plated steel, chrome finished, as the body portion. A handle member 42, which may be comprised of a suitable plastic or the like, is affixed as by screws or bolts 43 to the upper portion of a door 40. A centrally located magnetic catch 44 is carried rearwardly of front wall portion 22 and supported on flange 24, and is provided with a front opening 45 through which the magnetic attraction of the permanent magnet of the catch 44 serves to hold the upper portion of door 40 in closed position. It is noted that the inner flanges 14, as best shown in FIGURE 2, are longer than the outer flanges 13 of the end plates 11, and the edges of door 40 rest thereagainst when the door is in closed position.

Means are provided for heating the space 33, and, consequently, dehumidifying the air in the space 33 and, by circulation of air between the ends 34 of inner bottom wall 30, and the end walls 12 warming and drying the air interiorly of the cabinet. Such heating means take the form of a low heat, high resistance heating element 50 which is provided with the usual internal resistance coil 51 and outer insulating casing 52. A thin layer 53 of thermoplastic heat resistant insulating material is positioned about the exterior of heating element 50 and serves to insulate the same against contact with a U-shaped metal supporting strip 54, which terminates in transversely extending flange members 55. A flat sheet 56 of thermoplastic insulating material is positioned immediately adjacent the underside of inner bottom wall 30 and serves to diffuse direct heat from the flanges or legs 55. Suitable bolts or screws 57 extend through suitable openings in inner bottom wall 30 and legs or flanges 55 and are provided with locking nuts 58 of any desired conventional type to secure the U-shaped member 54 in position about heating element 50 to retain the same in position.

Wires 59 and 60 extend from each end of resistance element 50 to a common conduit 61 which extends through a bushing 62 in rear wall 21 between bottom walls 27 and 30 and, in the illustrative embodiment herein shown, terminates in a plug 62 adapted for insertion in any conventional electrical outlet. It is to be understood that the resistance element 50 in the instant application is adapted to receive conventional house voltage in the neighborhood of 115 volts, but alternatively, if desired, the resistance element may be provided to take the 6, 12, or 32 volts afforded by a storage battery or the like, and the plug 62 may be supplanted by a suitable terminal for connection to a battery.

Suitably secured to the inner surface of outer bottom wall 27 directly beneath heating element 50 is a sheet 65 of asbestos or other heat insulating material, which precludes the direct passage of heat to the outer bottom wall, thus precluding any damage to the surface upon which the cabinet is positioned.

From the foregoing it will now be seen that there is herein provided a cabinet structure for preserving the crispness of foodstuffs or the like by the use of warm, dry air resulting in the dehumidification of such food products, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. In a cabinet of the character described, in combination, a pair of complementary substantially rectangular end plates, each having a perimetric inner and outer flange defining a groove about the edge thereof, a sheet metal body portion including an integral top wall, back wall, and depending front flange, having its edges seated in said groove, an inner bottom wall and an outer bottom wall, said outer bottom wall seating in the bottom grooves of said end plates, said inner and outer bottom walls defining a heating chamber, the ends of said inner bottom wall terminating short of said end plates to provide a space for circulation of air from said heating chamber, means, comprising elongated rods extending between said end plates adjacent their corners, and screws engaging in the interiorly threaded ends of said rods for securing said end plates and said body and bottom walls in related assembly, a front door pivotally mounted on the rod adjacent the front lower corners of said end plates, a magnetic latch normally holding said door in closed position, heating means in said heating chamber, and means including a cord extending through the rear wall of said body for supplying electric power to said heating means.

2. The structure of claim 1 wherein said heating means comprises an electrically conductive resistance element, an outer shell of insulating material, a sleeve of thermoplastic material surrounding said shell, a metal supporting bracket including a U-shaped portion partially surrounding said resistance element, shell and sleeve, and laterally extending flanges bolted to the underside of said inner bottom wall, and a sheet of thermoplastic heat insulating material between said flanges and said underside of said bottom wall.

3. The structure of claim 2 wherein a sheet of asbestos is secured to the inner side of said outer bottom wall directly beneath said heating means.

4. In a cabinet of the character described, in combination, a pair of complementary end plates, means defining a perimetric groove about the edge of each end plate, a body portion including a top wall and a back wall and having its edges seated in a portion of said groove in said end plates, an inner bottom wall and an outer bottom wall, said outer bottom wall having its edges seating in a further portion of said groove in said end plates, said inner and outer bottom walls defining a heating chamber therebetween, the edges of said inner bottom wall terminating short of said end plates to provide a space for circulation of air from said heating chamber, means for securing said end plates, said body portion and said bottom walls in related assembly, a door member movable between an open position and a closed position, means normally holding said door member in said closed position, heating means in said heating chamber, and means for supplying power to said heating means.

References Cited in the file of this patent
UNITED STATES PATENTS

| 2,158,641 | Steneberg | May 16, 1939 |
| 2,249,693 | Steneberg | July 15, 1941 |
| 2,511,328 | Cline | June 13, 1950 |
| 2,531,237 | Steinberg | Nov. 21, 1950 |
| 2,651,703 | Atkins | Sept. 8, 1953 |

FOREIGN PATENTS

| 615,171 | Great Britain | Jan. 3, 1949 |